United States Patent [19]

Posso

[11] 4,309,010
[45] Jan. 5, 1982

[54] TRIPOD WITH ADJUSTABLE SUPPORT SURFACE FOR SUPPORTING VARIOUS OBJECTS

[75] Inventor: Patrick Posso, Lausanne, Switzerland

[73] Assignee: Gefitec S.A., Lausanne, Switzerland

[21] Appl. No.: 85,270

[22] Filed: Oct. 16, 1979

[30] Foreign Application Priority Data

Oct. 24, 1978 [CH] Switzerland ............... 10976/78

[51] Int. Cl.³ ............................................. F16M 11/38
[52] U.S. Cl. ................................... 248/168; 248/166; 248/169
[58] Field of Search ............... 248/168, 169, 171, 435, 248/177; 354/293

[56] References Cited

U.S. PATENT DOCUMENTS

| | | | |
|---|---|---|---|
| 2,518,817 | 8/1950 | Ries | 248/168 |
| 2,550,415 | 4/1951 | Krammermeyer | |
| 3,480,250 | 11/1969 | Hankins | 248/168 |
| 3,921,947 | 11/1975 | Adam | 248/168 |
| 4,196,881 | 4/1980 | Davidson | 248/169 |

FOREIGN PATENT DOCUMENTS

| | | |
|---|---|---|
| 1169146 | 11/1964 | Fed. Rep. of Germany . |
| 2216438 | 10/1973 | Fed. Rep. of Germany ...... 248/168 |
| 2256125 | 4/1974 | Fed. Rep. of Germany ...... 248/168 |
| 441362 | 5/1912 | France . |

*Primary Examiner*—James T. McCall
*Attorney, Agent, or Firm*—Shenier & O'Connor

[57] ABSTRACT

The present invention relates to a tripod with adjustable support surface for supporting various objects, wherein the stand comprises a central support provided with pivot pins for telescopic legs adapted to pivot in radial planes. According to the invention, a selection ring is mounted to rotate about the vertical axis of the support, immobilised in axial translation and limited in amplitude of rotation in order to be able to occupy at least two angular positions and this ring bears at least two sets of three stop members cooperating with end stops of the legs, these sets being offset angularly in register with the positions of the ring and defining respectively at least two different inclinations of these legs. This tripod may be used for supporting photographic, cinematographic, or video shot taking apparatus, projection apparatus, geodesic measuring instruments, antennas for emitting or receiving radioelectric waves or the like.

6 Claims, 5 Drawing Figures

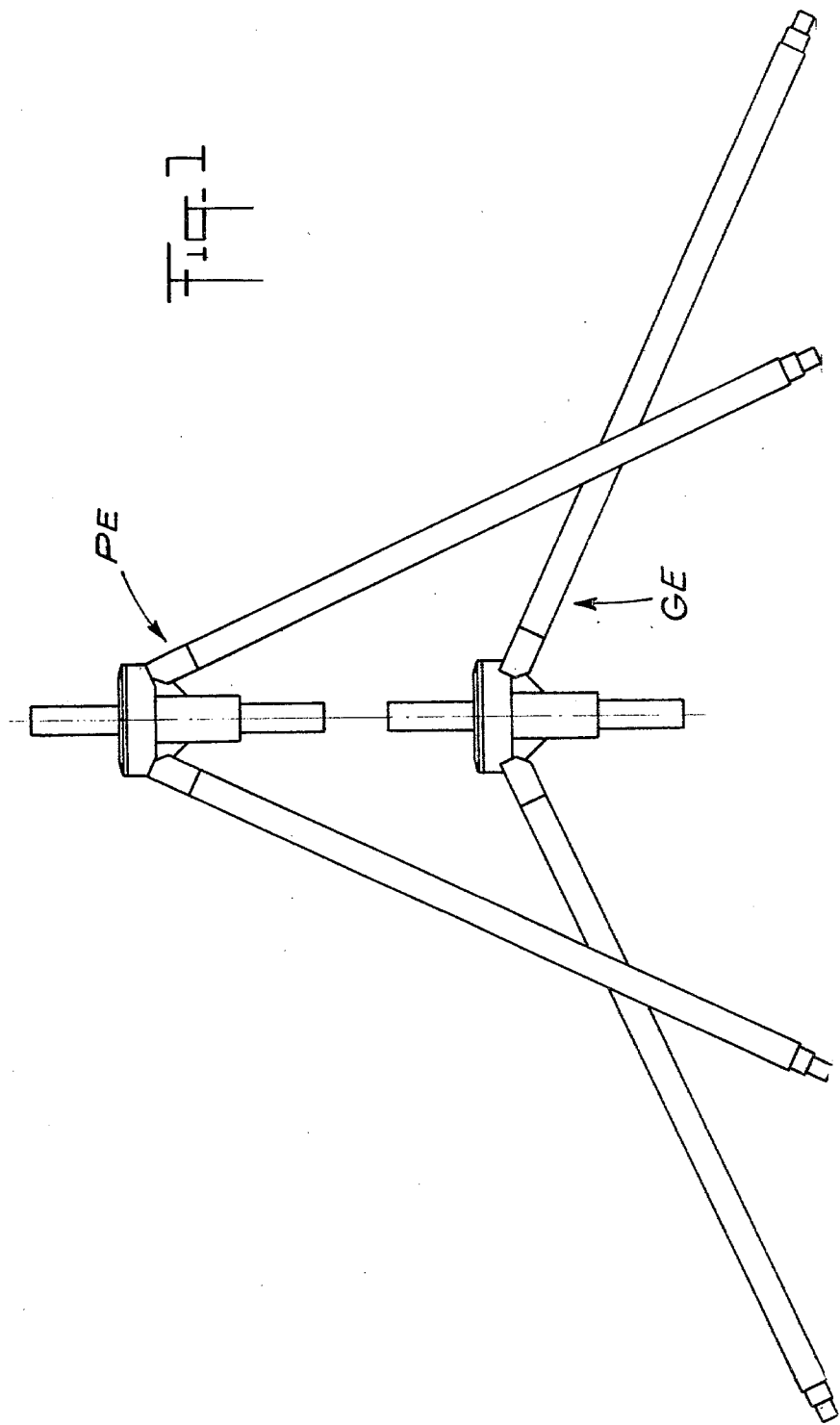

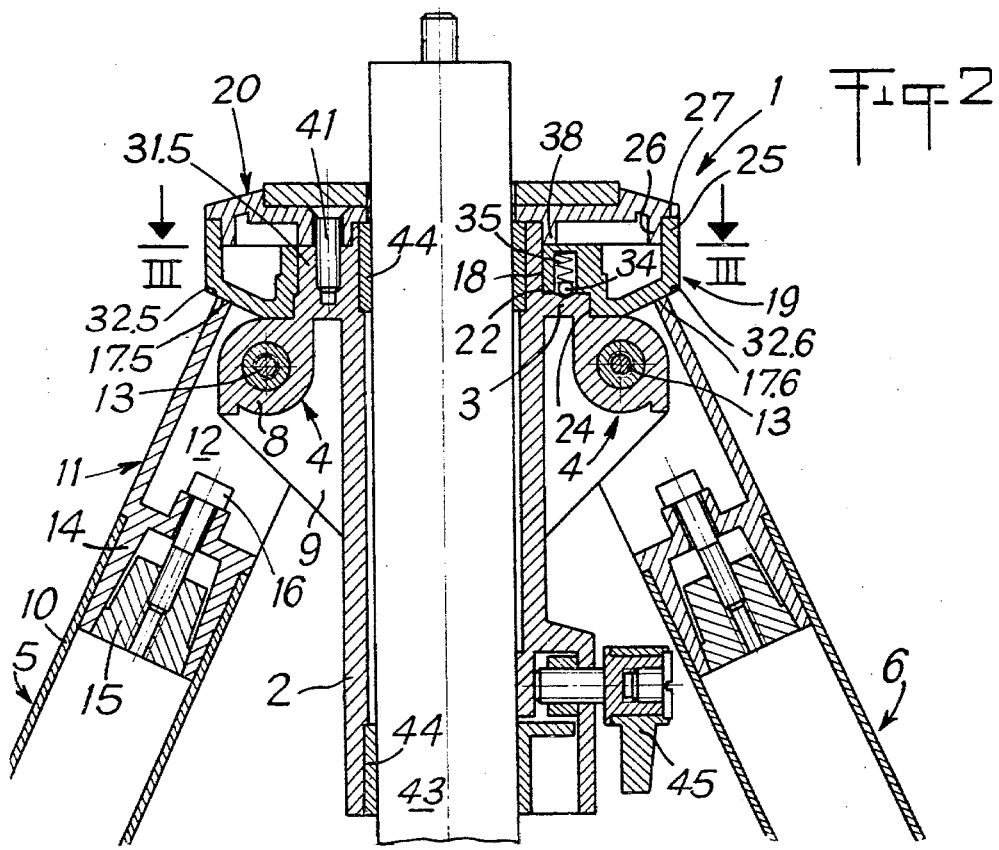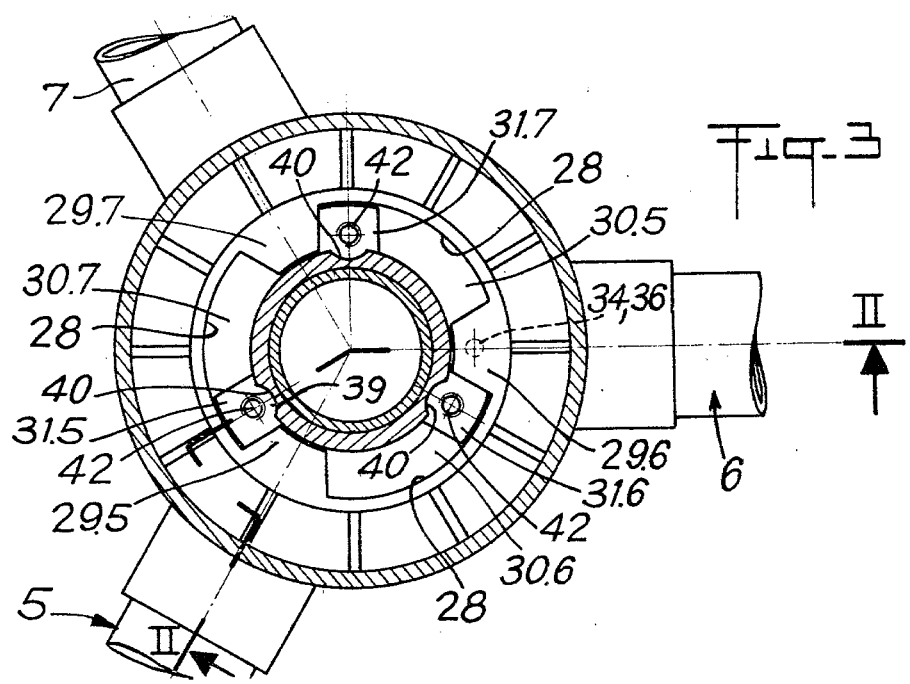

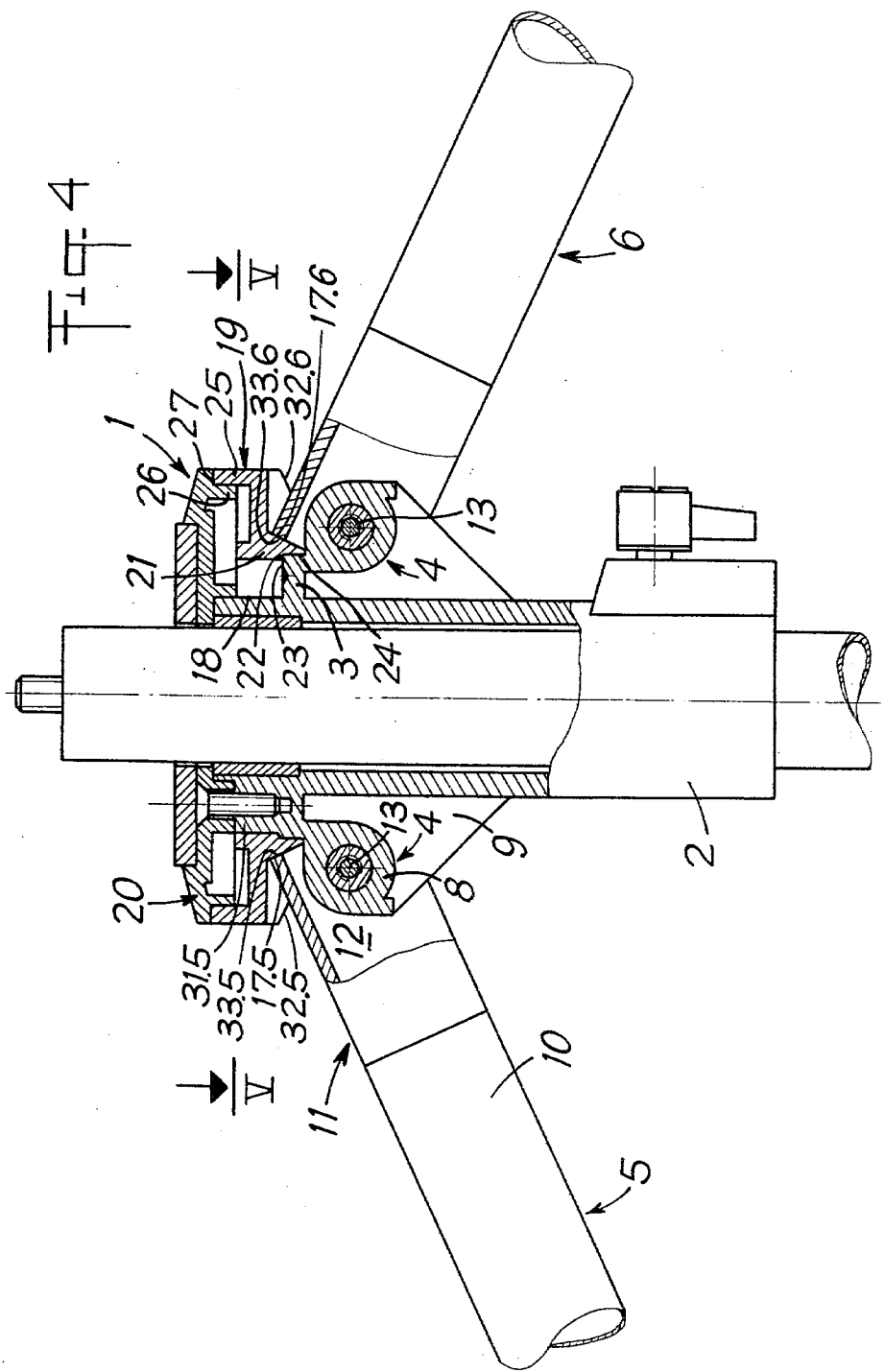

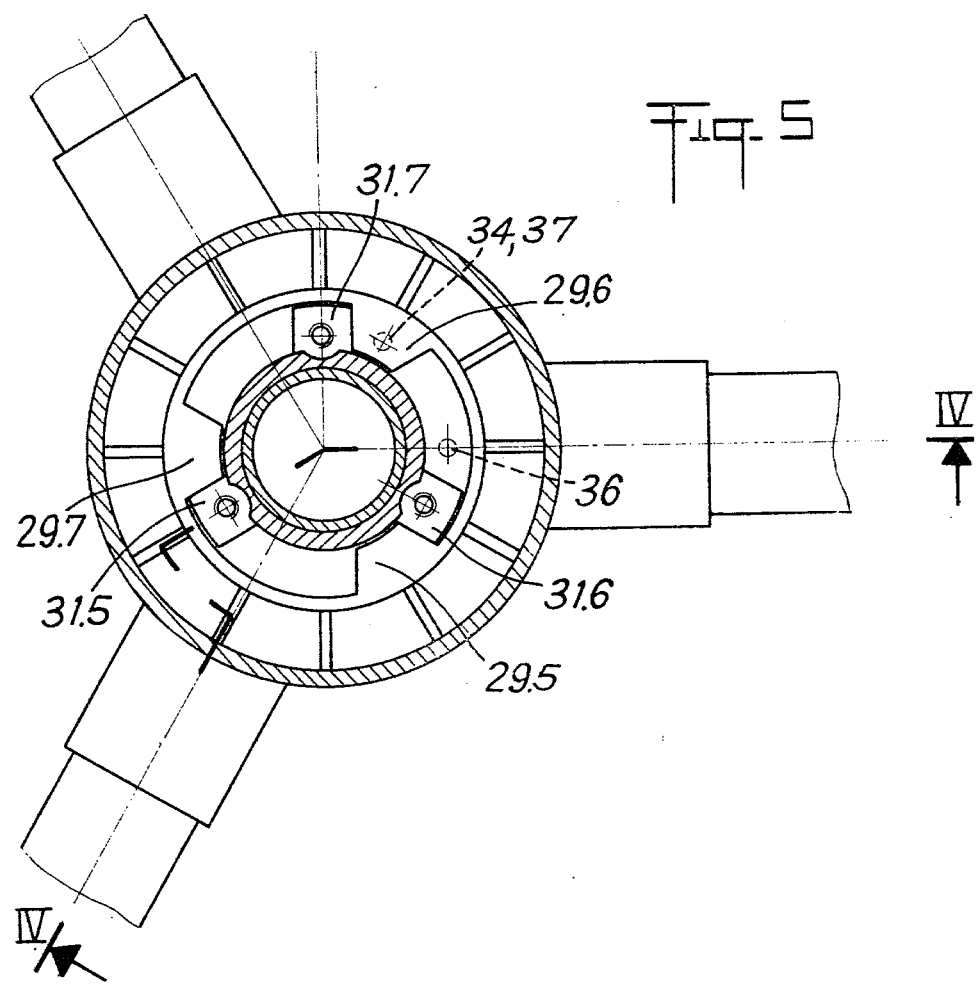

TRIPOD WITH ADJUSTABLE SUPPORT SURFACE FOR SUPPORTING VARIOUS OBJECTS

The present invention relates to a tripod with adjustable support surface for supporting various objects.

German Pat. No. 1 169 146 describes a tripod of this type which comprises, on the one hand, a central support provided with pivot pins for telescopic legs adapted to pivot in radial planes and, on the other hand, a selection ring mounted to rotate about the substantially vertical axis of the support, immobilised in axial translation and limited in amplitude of rotation in order to be able to occupy at least two angular positions; this ring presents, opposite each leg, at least two recesses of different levels, hollowed in its upper face and angularly offset in register with the selective positions of said ring, each recess constituting a stop for a catch which projects laterally on the upper end of the leg in question.

French Pat. No. 441 362 also relates to a tripod with adjustable support surface. The central support of this tripod, beneath which the telescopic legs are pivoted, is shaped as a threaded hub which cooperates with a tapped ring of which the lower face constitutes a support element for catches projecting laterally on the upper end of these legs. By rotating the ring, the level of its lower support surface, and consequently the inclination of the legs, is adjusted.

U.S. Pat. No. 2,550,415 also relates to a tripod, beneath the central support of which are pivoted three telescopic legs. This support also has lugs projecting beneath its lower face, said lugs located opposite the free end of the legs to form stops which determine one sole inclination of said legs.

It is important to note that, in all these known tripods, the support of each leg is effected via a projecting element in flexion. Therefore the kinematic device is relatively fragile and risks breaking or being deformed, this obviously being prejudicial to the stability of the tripod.

It is an object of the present invention to remedy this major drawback by proposing a combination of means such that the efforts are always supported along the axis of each leg, so that the legs are in axial compression and the rotating ring in compression in a radial plane.

This result is particularly interesting since all the parts being under compressive stress may be made of plastics material. Numerous advantages follow from this: mass production, low cost price, lightness, functional reliability, little maintenance, etc.

According to the invention, each leg extends beyond its pivot axis upwardly, in order to constitute, by its end merged with a cross section, the corresponding stop and the lower surface of the selection ring presents, in relation with this stop to form combined stop members, at least two inclined ramps extending parallel and at the same distance from the pivot axis of the leg in question, but converging towards the geometric axis of the support along different angles, these ramps being offset angularly along the circumferential periphery of the ring in register with the two positions of this ring.

In a preferred embodiment, the ring comprises, on the one hand, an annular base resting on a lower central seat of the support and centred on a cylindrical bearing surface thereof, on the other hand a tubular edge applied against an upper peripheral seat of the support and centred on a cylindrical skirt thereof, said ring then being free to rotate but immobilised in axial translation; this ring further presents a cylindrical bore concentric with respect to the cylindrical bearing surface of the support in which are formed, in projection, three equiangular stops extending up to this bearing surface but without touching it and defining three sectorial recesses in which three projecting studs of said bearing surface extend but without touching the bore and cooperating with the stops to determine the above-mentioned angular positions of the ring.

In this embodiment, the support comprises a tubular sleeve fast with a flange of which the lower part presents, in projection, three lugs for the pivoting of the legs and of which the upper part forms, in cooperation with the projecting end of the sleeve, the lower seat, the cylindrical bearing surface and the three studs mentioned above, whilst the upper seat is constituted by a cover centred on said projecting end of the sleeve and provided with projecting bosses applied and screwed on said studs.

The invention will be more readily understood on reading the following description with reference to the accompanying drawings, in which:

FIG. 1 is a schematic elevation visualizing two particular positions of the stand, in accordance with the invention, of which the legs are folded in the same plane to enable the result obtained to be more readily understood.

FIG. 2 is an elevation-section taken along line II—II of FIG. 3 and showing the head of the photographic stand in small-spacing position, FIG. 3 is a plan view in section along line III—III of FIG. 2, and FIGS. 4 and 5 are views similar to FIGS. 2 and 3 respectively, illustrating the wide-spacing position.

Referring now to the drawings, FIGS. 2 and 3 clearly show that the photographic stand comprises a central support 1 constituted by a tubular sleeve 2 fast with a flange 3 having projecting therefrom, in its lower part, three lugs 4 for the pivoting of three telescopic legs 5 to 7 adapted to pivot in equiangular radial planes.

In the example shown, each lug 4 comprises a collar member 8 connected to the sleeve 2 by two lateral ribs 9. The upper tubular element 10 of each telescopic leg is equipped with an endpiece 11 of which the free end is a U-section. The wings 12 of this section are disposed on either side of the ribs 9 of the corresponding lug, which ribs therefore ensure the perfect lateral holding of the leg in question. These wings 12 and the collar member 8 have a pivot pin 13 passing therethrough, about which said leg may pivot. The end piece 11 is fast with a split skirt 14 normally fitted in the opening of the upper element 10 of this leg and cooperating with a conical mandrel 15 which provokes expansion thereof when a screw 16 is tightened and thus connection of said endpiece with said element.

It is important to note that the clean terminal edge of each end piece is perpendicular to the geometrical axis of the leg to which it belongs and that this edge constitutes a stop determining, as is set forth hereinafter, the inclination of said leg. The three stops of the legs 5, 6 and 7 are referenced 17.5, 17.6 and 17.7.

The top end of the sleeve projecting from the flange 3 constitutes a cylindrical bearing surface 18 about which is rotatably mounted a selection ring 19 and on which is centred a cover 20.

The ring 19 comprises a central hub 21 which defines (FIG. 4) a shoulder 22 resting on a lower seat 23 formed by the visible face of the flange 3 and, on the other hand, a bore 24 centred about said flange. The hub is fast with a peripheral tubular edge 25 guided in rotation about a cylindrical skirt 26 of the cover and applied against an upper seat 27 formed by a marginal part of this cover.

As shown in FIGS. 2 and 3, the selection ring 19 has projecting therefrom, in a cylindrical bore 28 concentric with respect to the fixed bearing surface 18, three stops 29.5, 29.6 and 29.7 distributed equi-angularly, extending up to this bearing surface but without touching it and defining therebetween three recesses in the form of sectors 30.5, 30.6 and 30.7. Reciprocally, the top end of the sleeve 2 has projecting therefrom, on the bearing surface 18 and in the said recesses, three studs 31.5, 31.6 and 31.7 distributed equi-angularly, extending up to the bore 28 but without touching it and cooperating selectively by their lateral faces with the stops.

Thus, when the stop 29.5 is in contact with the stud 31.5 (and the stops 29.6, 29.7 with the studs 31.6, 31.7), the legs 5 to 7 occupy the position of small spacing with respect to one another (FIGS. 2 and 3), which position is designated by reference PE in FIG. 1. To this end, the selection ring 19 comprises three stop members 32.5, 32.6 and 32.7 distributed equi-angularly in the lower part of this ring and located, in the above-mentioned "PE" position, opposite the end stops 17.5, 17.6 and 17.7 of the legs 5, 6 and 7.

Similarly, when the stop 29.5 is in contact with the stud 31.6 (and the stops 29.6, 29.7 with the studs 31.7, 31.5), the legs 5 to 7 occupy the position of wide spacing with respect to one another (FIGS. 4 and 5), which position is referenced GE in FIG. 1. To this end, the selection ring 19 comprises three stop members 33.5, 33.6 and 33.7 distributed equi-angularly in the lower part of this ring and located, in the above-mentioned "GE" position, opposite the end stops 17.5, 17.6 and 17.7 of the legs 5, 6 and 7.

The stop members 32 and 33 are inclined ramps which, when they cooperate with the leg stops 17, all extend parallel and at the same distance from the pivot pins 13. However, the angle formed by each stop member 32 with respect to the geometrical axis of the sleeve 2 (FIG. 2) is larger than that of each stop member 33 (FIG. 4), with the result that, in the first case (position "PE"), the inclination of the legs is small with respect to the vertical and the support surface of the stand relatively reduced whilst, in the second case (position "GE"), the inclination of said legs is considerable and the support surface relatively increased.

On the other hand, the stop members 32 and 33 combined with the same leg stop 17 are offset by the angle which is necessary for displacing the same stop 29 of the ring between two studs 31 of the fixed support 1. Thus, by rotating the ring 19, the operator selects either position "PE", or position "GE". For this selection to be progressive and reversible, it may be advantageous if the inclined ramps constituting two stop members 32 and 33 combined with the same leg stop 17 are connected together by an evolutive connecting surface; the rotation of the selection ring 19 may therefore control the pivoting of the legs.

It may also be advantageous if the selection of the positions of the stand is sensitive and stable. To this end, a temporary locking member is interposed between the flange 3 of the fixed support and the rotating selection ring 19. In the example shown, it is a ball 34 housed in a blind hole in the stop 29.6 of the ring (FIGS. 2 and 3) and pushed by a spring 35 towards the flange 3, this ball cooperating selectively with two impressions 36 and 37 made in said flange for the two "PE" and "GE" positions of said stop 29.6.

It is obvious that the selection ring 19 must be retained axially by the upper bearing surface 27 for maintaining the legs 5 and 7 in one or the other of their "PE" and "GE" positions. It is therefore necessary that the cover 20 be perfectly positioned and fixed relatively to the sleeve 2. This cover has in this case, projecting therefrom, an annular ring 38 centred on the cylindrical bearing surface 18 and fast with three projecting bosses 39 applied on the studs 31.5 to 31.7, these bosses being positioned in notches 40 in the upper end of the sleeve and fixed by means of screws 41 of which the head abuts on the cover and of which the threaded stem is blocked in a tapped hole 42 in the studs (FIGS. 2 and 3).

Moreover, there is nothing against the ring 19 selecting more than two positions of the stops 29 and consequently more than two inclinations of the legs 5 to 7. In this case, the locking member 34, 35 may also cooperate with one or more intermediate impressions determining the or each intermediate position; on the other hand, it is possible to provide on the flange 3 and/or the base 21 of the ring, supplementary retractable studs and/or stops.

Furthermore, other embodiments are possible. In particular, the studs 29 of the selection ring 19 may cooperate with the cylindrical bearing surface 18 of the support 1 to ensure the guiding of this ring in rotation; however, the same result may also be obtained by placing the stops 31 of the fixed support in contact with the bore 28 of the rotating ring.

Of course, the stand as described hereinbefore may be used with numerous accessories. For example, the apparatus to be supported may be mounted on the cover 20 directly or via a bidirectionally swivelling platform. However, it appears to be more advantageous to use a subsidiary elevating means which, in the example shown, is constituted by a column 43 mounted to slide and possibly to rotate in bearings 44 in the sleeve 2, this column being adapted to be immobilised at any level by a blocking member 45. This smooth column can be replaced by a column with rack cooperating with a pinion controlled by a crank mounted to rotate in the fixed cover 20.

The invention is not limited to the embodiment shown and described in detail, as various modifications may be made thereto without departing from its scope.

The stand forming the subject of the invention, may be used for supporting photographic, cinematographic or video shot taking apparatus, projecting apparatus, geodesic measuring instruments, antennas for emitting or receiving radioelectric waves or the like.

I claim:

1. A tripod with adjustable support surface for supporting various objects, particularly photographic or cinematographic apparatus, comprising a central support provided with pivot pins for telescopic legs adapted to pivot in radial planes and a selection ring mounted to rotate about the substantially vertical axis of the support, immobilized in axial translation and limited in amplitude of rotation in order to be able to occupy at least two angular positions, this ring bearing at least two sets of three stop members cooperating with end stops of the legs and these sets being offset angularly in register with the positions of the ring, in order respectively to define at least two different inclinations of these legs so that by rotating said ring, one set of stop members is selected to determine one of the inclinations of said legs, wherein each leg extends beyond its pivot axis, upwardly, in order to constitute, by its end merged with a cross section, the corresponding stop, and the lower surface of the selection ring presents, in relation with this stop for forming the combined stop members, at least two inclined ramps extending parallel and at the same distance from the pivot axis of the adjacent leg, but converging towards the geometrical axis of the support along different angles, these ramps being offset angularly along the circumferential periphery of the ring in register with the two positions of this ring.

2. A tripod as claimed in claim 1, wherein the two inclined ramps combined with the same leg stop are connected together by a progressive surface enabling the pivoting of the legs to be controlled.

3. A tripod as claimed in claim 1, wherein the selection ring has projecting therefrom three protuberant stops, distributed equiangularly and interposed between two annular seats of the support which ensure the immobilisation in axial translation of this ring, these seats being connected by a cylindrical bearing surface cooperating with the stops for the guiding of said ring in rotation and this bearing surface being fast with three studs cooperating selectively with the faces of these stops for determining the above-mentioned angular positions of the ring.

4. A tripod as claimed in claim 1, wherein the selection ring has projecting therefrom in a cylindrical bore three protuberant stops, distributed equiangularly and interposed between two annular seats of the support which ensure the immobilization of this ring in axial translation, these seats being connected by studs cooperating, on the one hand, with the bore for guiding said ring in rotation and, on the other hand, selectively with the faces of the stops for determining the above-mentioned angular positions of the ring.

5. A tripod as claimed in claim 1, wherein the ring comprises a hub resting on a lower central seat of the support and centred thereabout a tubular edge applied against an upper peripheral seat of the support and centred on a cylindrical skirt thereof, said ring then being free to rotate but immobilized in axial translation, and this ring presents a cylindrical bore concentric with respect to a central cylindrical bearing surface of the support in which are formed, in projection, three equiangular stops extending up to said bearing surface but without touching it and defining three sectorial recesses in which three projecting studs on said bearing surface extend but without touching the bore and cooperate with the stops to determine the above-mentioned angular positions of the ring.

6. A tripod as claimed in claim 3, wherein the support comprises a tubular sleeve fast with a flange of which the lower part has projecting therefrom three lugs for the pivoting of the legs and of which the upper part forms, in cooperation with the projecting end of the sleeve, the seat placed at the bottom, the said cylindrical bearing surface and the said three studs, while the upper seat is constituted by a cover centered on said projecting end of the sleeve and provided with projecting bosses applied and screwed on said studs.

* * * * *